UNITED STATES PATENT OFFICE.

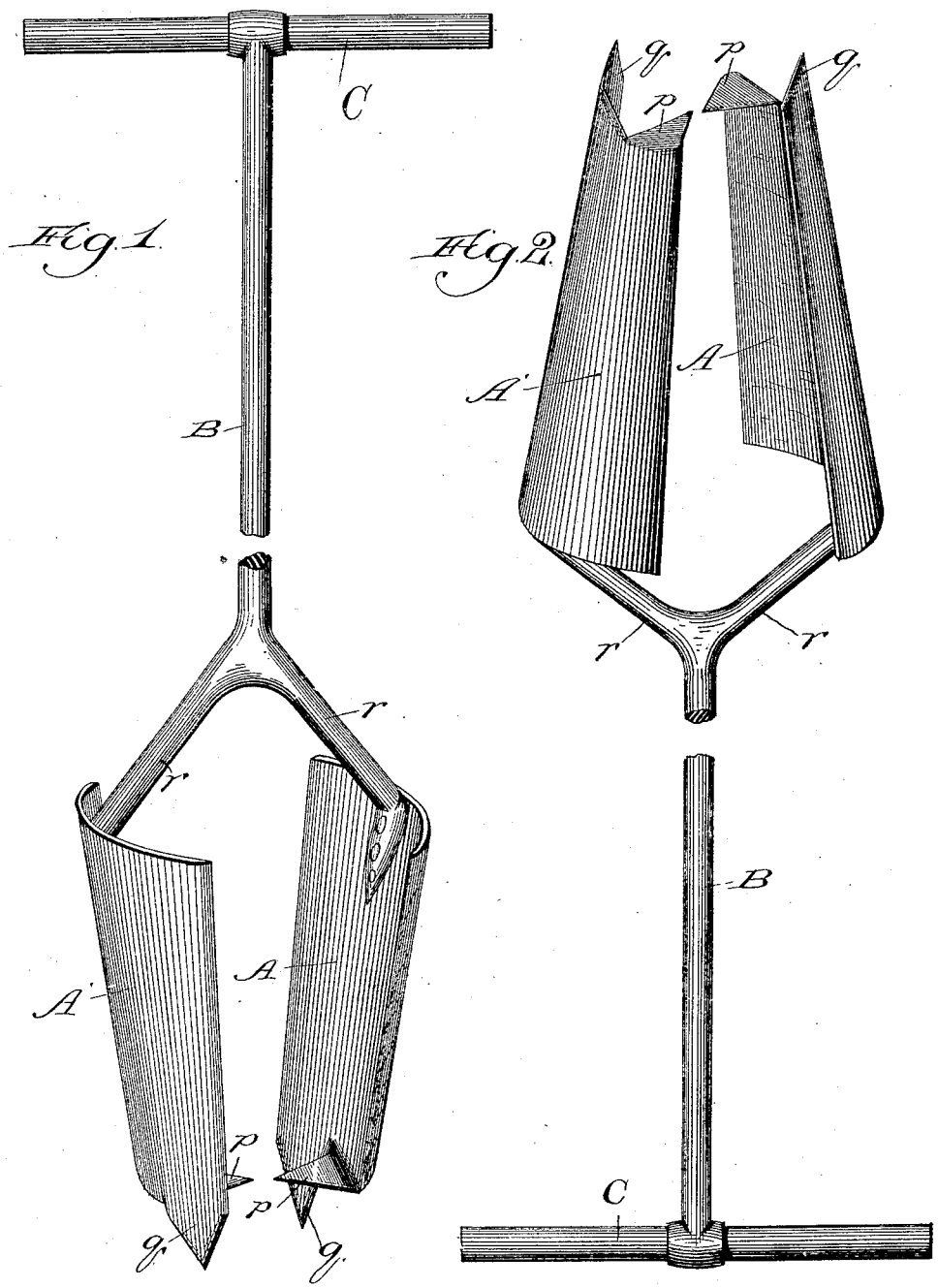

HENRY IWAN AND LOUIS IWAN, OF STREATOR, ILLINOIS.

EARTH-AUGER.

SPECIFICATION forming part of Letters Patent No. 342,516, dated May 25, 1886.

Application filed January 15, 1886. Serial No. 188,640. (No model.)

*To all whom it may concern:*

Be it known that we, HENRY IWAN and LOUIS IWAN, citizens of the United States, residing at Streator, in the county of La Salle and State of Illinois, have invented certain new and useful Improvements in Earth-Augers; and we hereby declare the following to be a full, clear, and exact description of the same.

Our invention relates to the class of earth-augers having concavo-convex blades connected with a handle, and which are variously modified as to their constructions for the purpose of attaining various alleged advantages of facility, efficacy, &c., of operation and simplicity of construction.

It is our object to provide a device of the foregoing nature of a novel construction, whereby, in turning the tool to produce an excavation, while the outline of the hole is being cut, the inclosed soil shall be loosened or separated for removal.

To this end our invention consists in the general construction of our improved device; and it also consists in certain details of construction and combinations of parts, all as hereinafter more fully set forth.

Referring to the drawings, Figure 1 represents our device in perspective with the stem broken away, and Fig. 2 is an inverse view of Fig. 1.

A A are longitudinally concavo-convex, preferably sheet-metal, blades, chamfered, as shown, each toward opposite lateral edges, and bolted or otherwise secured toward their upper ends to the bifurcated end or yoke $r$ of the stem B, provided with the handle C. The fastening of the blades in their respective positions is performed in a manner to cause them to converge, as shown, toward their lower ends, where they are provided each with a vertical or nearly-vertical bit, $q$, and a laterally-slanting horizontal or nearly-horizontal bit, $p$, the latter on one blade A being directly opposite a bit, $q$, on the other blade A, and vice versa.

The bits $q$ and $p$ comprise, preferably, extensions of their respective blades A, and are formed on each blade by slitting the latter at the desired place and bending one part to form the bit $p$ at an angle to the other part forming the bit $q$. Each bit is preferably chamfered toward its cutting-edge, as shown, to permit the tool to present cutting-edges on the bits when turned in the operation toward the right.

The device is operated by causing the bits $q$, and slanting somewhat laterally, as shown, to penetrate the soil to be excavated, turning the handle C to the right, whereby the bits $q$ cut the circle and the bits $p$ the inclosed surface, thereby loosening the soil, which is removed by withdrawing the implement, the bits $p$ affording a bottom sufficient to hold even dry soil between the blades, whence the excavated soil is dumped through the spaces between the blades.

Owing to the slanting forms of the bits $p$ they operate like a screw to cause the auger to penetrate the soil with increasing depth at each turn without requiring great, if any, pressure to be exerted by the operator.

What we claim as new, and desire to secure by Letters Patent, is—

1. An earth-auger having blades provided with downward and laterally cutting bits, substantially as described.
2. An earth-auger having blades provided with downward and laterally cutting chamfered bits, substantially as described.
3. An earth-auger having blades provided with downward-cutting chamfered bits and laterally-cutting chamfered slanting bits, substantially as described.
4. An earth-auger having chamfered blades provided with downward cutting chamfered bits and laterally-cutting chamfered slanting bits, substantially as described.
5. An earth-auger having blades A, provided with bits $q$ and $p$, substantially as and for the purpose set forth.
6. An earth-auger having a yoke, $r$, upon its stem B, blades A, secured upon the yoke, and provided with bits $q$ and $p$, substantially as and for the purpose set forth.
7. An earth-auger comprising, in combination, a stem, B, provided with a handle, C, and yoke $r$, converging chamfered blades A, secured to the yoke, and downward-cutting bits $q$ and laterally-cutting slanting bits $p$, extending from the lower extremities of the blades, substantially as and for the purpose set forth.

HENRY IWAN.
LOUIS IWAN.

In presence of—
G. L. RICHARDS,
THEO. ROCKENFELLER.